(12) United States Patent
Lehrer (10) Patent No.: US 9,665,981 B2
(45) Date of Patent: May 30, 2017

(54) SYSTEM AND METHOD FOR GENERATING 3-D MODELS FROM 2-D VIEWS

(71) Applicant: R.B. III Associates Inc, San Marcos, CA (US)

(72) Inventor: Matthew Lehrer, Carlsbad, CA (US)

(*) Notice: Subject to any disclaimer, the term of this patent is extended or adjusted under 35 U.S.C. 154(b) by 0 days.

(21) Appl. No.: 13/736,048

(22) Filed: Jan. 7, 2013

(65) Prior Publication Data

US 2014/0192043 A1 Jul. 10, 2014

Related U.S. Application Data

(63) Continuation-in-part of application No. 13/736,042, filed on Jan. 7, 2013, now Pat. No. 8,868,227.

(51) Int. Cl.
| | | |
|---|---|---|
| *G06T 15/00* | (2011.01) | |
| *G06T 19/00* | (2011.01) | |
| *G06T 15/04* | (2011.01) | |
| *A41H 3/00* | (2006.01) | |

(52) U.S. Cl.
CPC ............ *G06T 19/00* (2013.01); *A41H 3/007* (2013.01); *G06T 15/04* (2013.01); *G06T 2210/16* (2013.01)

(58) Field of Classification Search
CPC ......... G06T 17/10; G06T 15/04; G06T 19/00; G06T 2210/16; A41H 3/007
See application file for complete search history.

(56) References Cited

U.S. PATENT DOCUMENTS

| | | | | |
|---|---|---|---|---|
| 6,144,890 A | * | 11/2000 | Rothkop | G06F 17/5095 700/182 |
| 2008/0190339 A1 | * | 8/2008 | Hayakawa | D05B 19/02 112/470.04 |
| 2012/0086783 A1 | * | 4/2012 | Sareen | 348/47 |
| 2012/0249552 A1 | * | 10/2012 | Harvill et al. | 345/426 |
| 2013/0018498 A1 | * | 1/2013 | Jones et al. | 700/98 |

* cited by examiner

*Primary Examiner* — Devona Faulk
*Assistant Examiner* — Xilin Guo
(74) *Attorney, Agent, or Firm* — James M. Smedley LLC; James Michael Smedley, Esq.

(57) ABSTRACT

The present invention generally relates to apparel design. In particular, embodiments of the invention are directed to systems and methods for generating three dimensional models from two dimensional view, such as flat cut files, for use in the design of patterns for apparel.

16 Claims, 12 Drawing Sheets

SYSTEM AND METHOD FOR GENERATING 3-D MODELS FROM 2-D VIEWS

CROSS-REFERENCE TO RELATED APPLICATIONS

This application claims the benefit of U.S. patent application Ser. No. 13/736,042 filed Jan. 7, 2013, the entire disclosure of which is incorporated herein by reference.

FIELD OF THE INVENTION

The present invention generally relates to apparel design. In particular, embodiments of the invention are directed to systems and methods for generating three dimensional models from two dimensional views, such as flat cut files, for use in the design of patterns for apparel.

BACKGROUND

Historically, when designing apparel, such as t-shirts, hoodies, pants and team uniforms, the design has taken place on a two dimensional plane via flat cut files on a computer screen generally using illustration software designed for two dimensional illustration. In practice, a designer would digitally lay artwork over a flat cut piece, or pattern, that has been defined by a patternmaker. The designer would have to rely on his own eyesight and intuition in order to determine whether design elements that cross seams do in fact cross over as intended. For example, this process would be used when a designer would want to create a stripe starting on a sleeve, transitions to the main body piece of a t-shirt, and over to the other sleeve while maintaining proper alignment such that the end result creates one straight line.

Currently, designers need to digitally select and move design elements, through use of the illustration software, while later trying to match up the cut and sew lines to determine if the design turned out as expected. The presently used method is not an exact science, takes time to master, and is time consuming even when mastered.

Therefore, there is need in the art for a system and method for converting two dimensional flat cut views into three dimensional views for the purpose of apparel design. These and other features and advantages of the present invention will be explained and will become obvious to one skilled in the art through the summary of the invention that follows.

SUMMARY OF THE INVENTION

Accordingly, it is an aspect of the present invention to provide a system and method for converting two dimensional flat cut views into three dimensional views for the purpose of apparel design.

According to an embodiment of the present invention, a system for converting two dimensional flat cut views into three dimensional views comprises: a 3-D model generator module comprising physical memory storing instructions that cause the 3-D model generator module to: provide a user interface to a user; receive artwork from said user; apply artwork to a three dimensional model; and provide said three dimensional model to said user.

According to an embodiment of the present invention, the instructions further cause the 3-D model generator module to generate a garment pattern from said three dimensional model.

According to an embodiment of the present invention, the garment pattern is configured to be utilized in apparel design.

According to an embodiment of the present invention, the said garment pattern is printed onto a physical medium via a printing means.

According to an embodiment of the present invention, the said garment pattern comprises two dimensional flat cut pieces.

According to an embodiment of the present invention, the 3-D model generator module is provided over one or more networks in a web-based manner.

According to an embodiment of the present invention, the 3-D model generator module receives modifications to the three dimensional model from the user.

According to an embodiment of the present invention, the instructions further cause the 3-D model generator module to populate a data store with inputs from patternmakers and production models.

According to an embodiment of the present invention, the user interface is based at least in part on the inputs of the data store.

According to an embodiment of the present invention, a method for converting two dimensional flat cut views into three dimensional views for the purpose of apparel design includes the steps of: providing a user interface to a user via a 3-D model generator module; receiving artwork from said user; applying artwork to a three dimensional model; and providing said three dimensional model to said user.

According to an embodiment of the present invention, the method may include the step of generating a garment pattern from said three dimensional model.

According to an embodiment of the present invention, the method may include the step of printing said garment pattern onto a physical medium via a printing means.

According to an embodiment of the present invention, the method may include the step of receiving modifications to said three dimensional model from said user.

According to an embodiment of the present invention, the method may include the step of populating a data store with inputs from patternmakers and production models.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention generally relates to apparel design. In particular, embodiments of the invention are directed to systems and methods for generating three dimensional models from two dimensional view, such as flat cut files, for use in the design of patterns for apparel.

Figure 1:
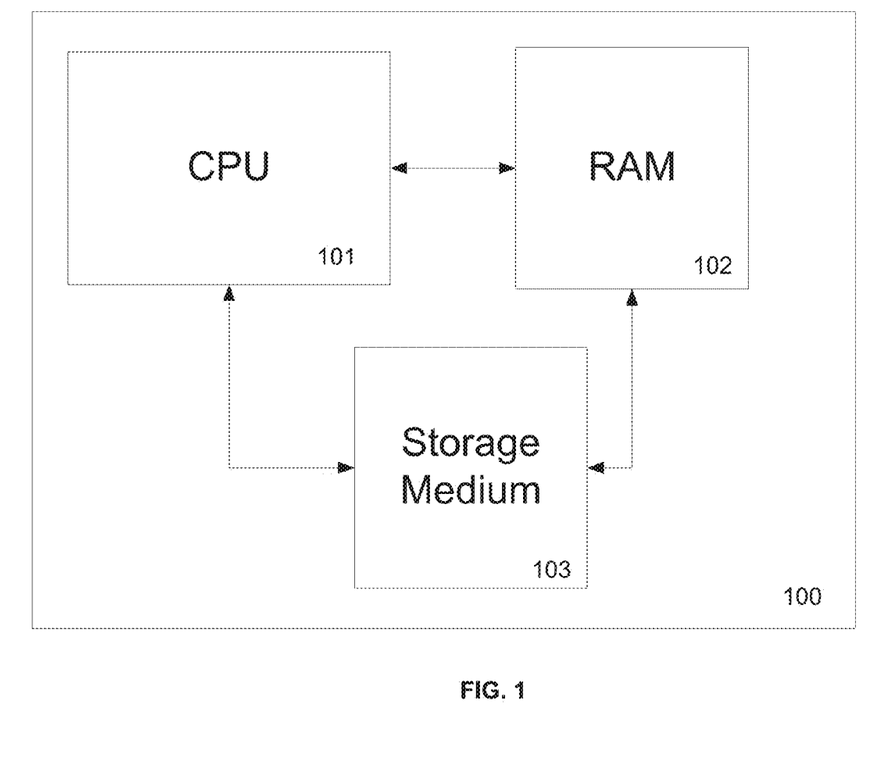
FIG. 1 illustrates a schematic overview of a computing device, in accordance with an embodiment of the present invention.

According to an embodiment of the present invention, the system and method is accomplished through the use of one or more computing devices. As shown in FIG. 1, one of ordinary skill in the art would appreciate that a computing device 100 appropriate for use with embodiments of the present application may generally be comprised of one or more of a Central processing Unit (CPU) 101, Random Access Memory (RAM) 102, and a storage medium (e.g., hard disk drive, solid state drive, flash memory, cloud storage) 103. Examples of computing devices usable with embodiments of the present invention include, but are not limited to, personal computers, smart phones, laptops, mobile computing devices, tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
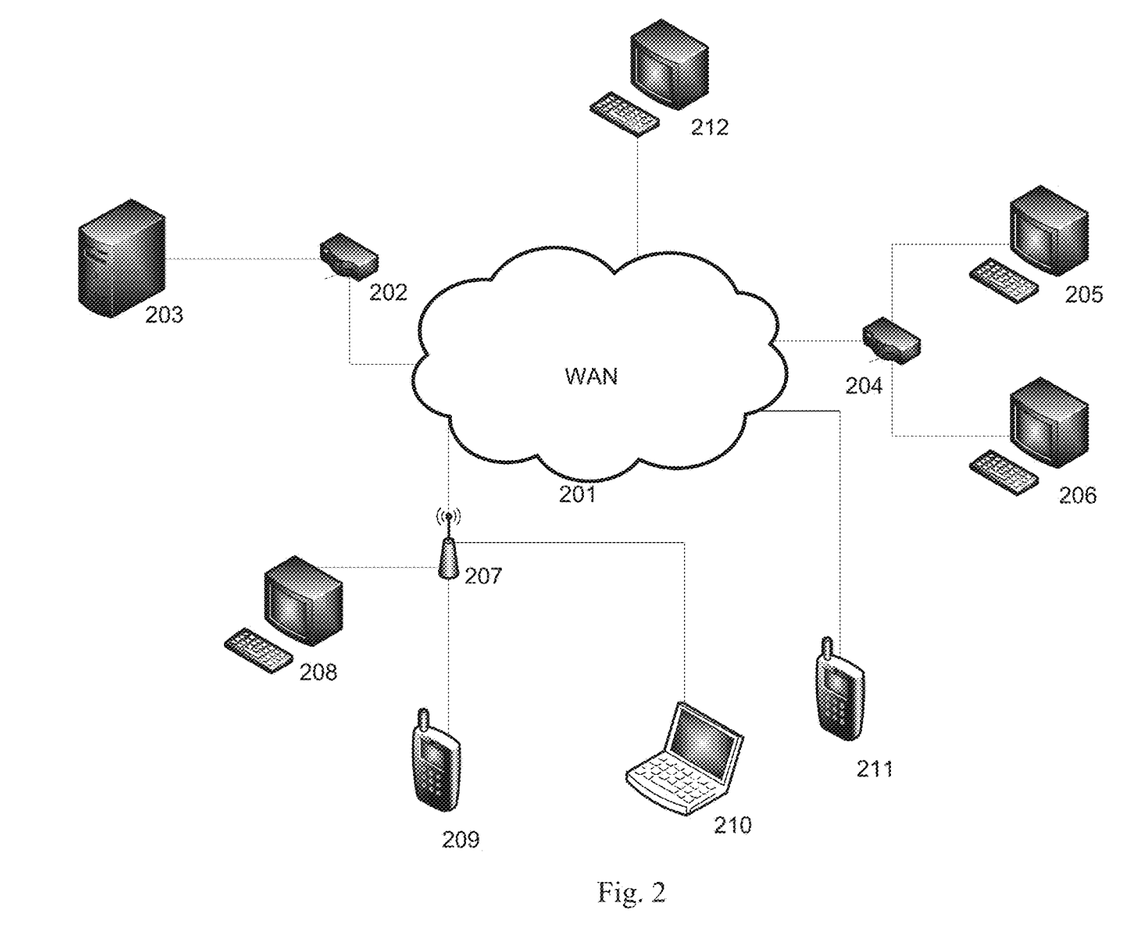
FIG. 2 illustrates a network schematic of a system, in accordance with an embodiment of the present invention.

Referring to FIG. 2, a schematic overview of a system in accordance with an embodiment of the present invention is shown. The system is comprised of one or more application servers 203 for electronically storing information used by the system. Applications in the application server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to WAN 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via WAN 201 or other network in numerous ways. For instance, a component may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art would appreciate that there are numerous ways that a component may connect to server 203 via WAN 201 or other network, and embodiments of the present invention are contemplated for use with any method for connecting to server 203 via WAN 201 or other network. Furthermore, server 203 could be comprised of a personal computing device, such as a smartphone, acting as a host for other computing devices to connect to.

According to an embodiment of the present invention, the system and methods herein described may be implemented through use of a three dimensional (3-D) model generator module. The 3-D model generator module is configured to generate 3-D models from two dimensional (2-D) inputs. The 2-D inputs, may include, but are not limited to, flat cut files, image files (e.g., JPGs, GIFs, TIFFs, BMPs), illustrator files and other 2-D file formats and electronic formats. The 3-D models may then be manipulated by users to confirm, modify and approve the alignment and other characteristics of their design patterns. In this manner, users can verify the accuracy of their 2-D inputs that will be used to later generate apparel from.

Figure 3:
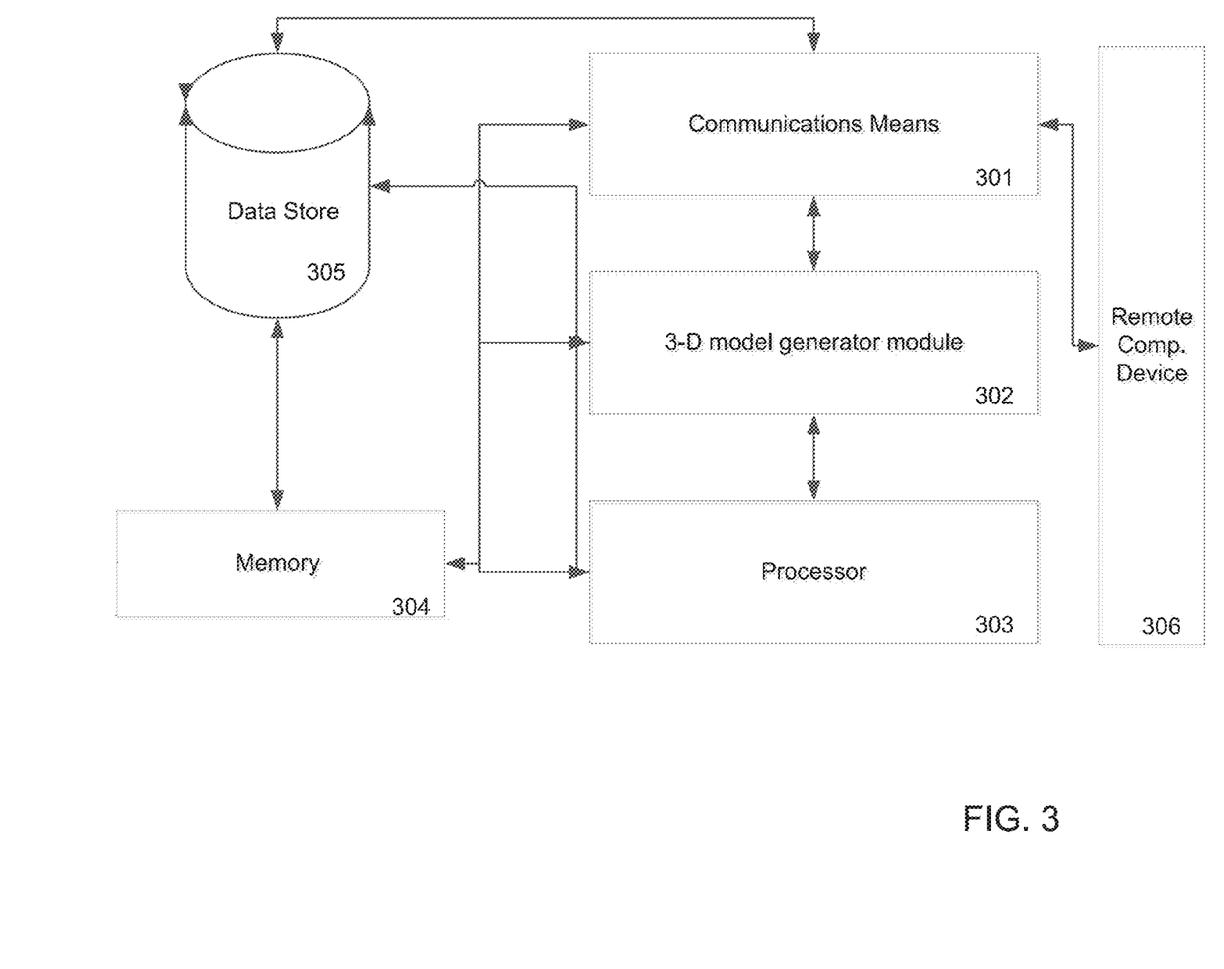
FIG. 3 is a schematic of an exemplary embodiment of a web-based system for generating three dimensional models from two dimensional views.

Turning now to FIG. 3, an exemplary embodiment of a system for generating three dimensional models from two dimensional views is shown. In this embodiment, the graphics correction engine includes a communications means 301, a 3-D model generator module 302, a processor 303, a non-transitory memory module 304 and a data store 305. In this embodiment, the 3-D model generator module 302 works in conjunction with the processor 303, memory 304, data store 305 and communications means 301 to process 3-D models for a remote computing device 306. This is a web-based system model, whereby the system provides processing functionality for a remote user by processing requests received from the user based on inputs received from the user. While the embodiment shown in FIG. 3 is an exemplary embodiment, other embodiments may include additional or fewer components. One of ordinary skill in the art would appreciate that there are numerous configurations of the components that could be utilized with embodiments of the present invention, and embodiments of the present invention are contemplated for use with any configuration of components.

According to an embodiment of the present invention, the communications means of the graphics correction engine may be, for instance, any means for communicating data over one or more networks. Appropriate communications means may include, but are not limited to, wireless connections, wired connections, cellular connections, data port connections, Bluetooth connections, fiber optic connections, modems, network interface cards or any combination thereof. One of ordinary skill in the art would appreciate that there are numerous communications means that may be utilized with embodiments of the present invention, and embodiments of the present invention are contemplated for use with any communications means.

Figure 4:
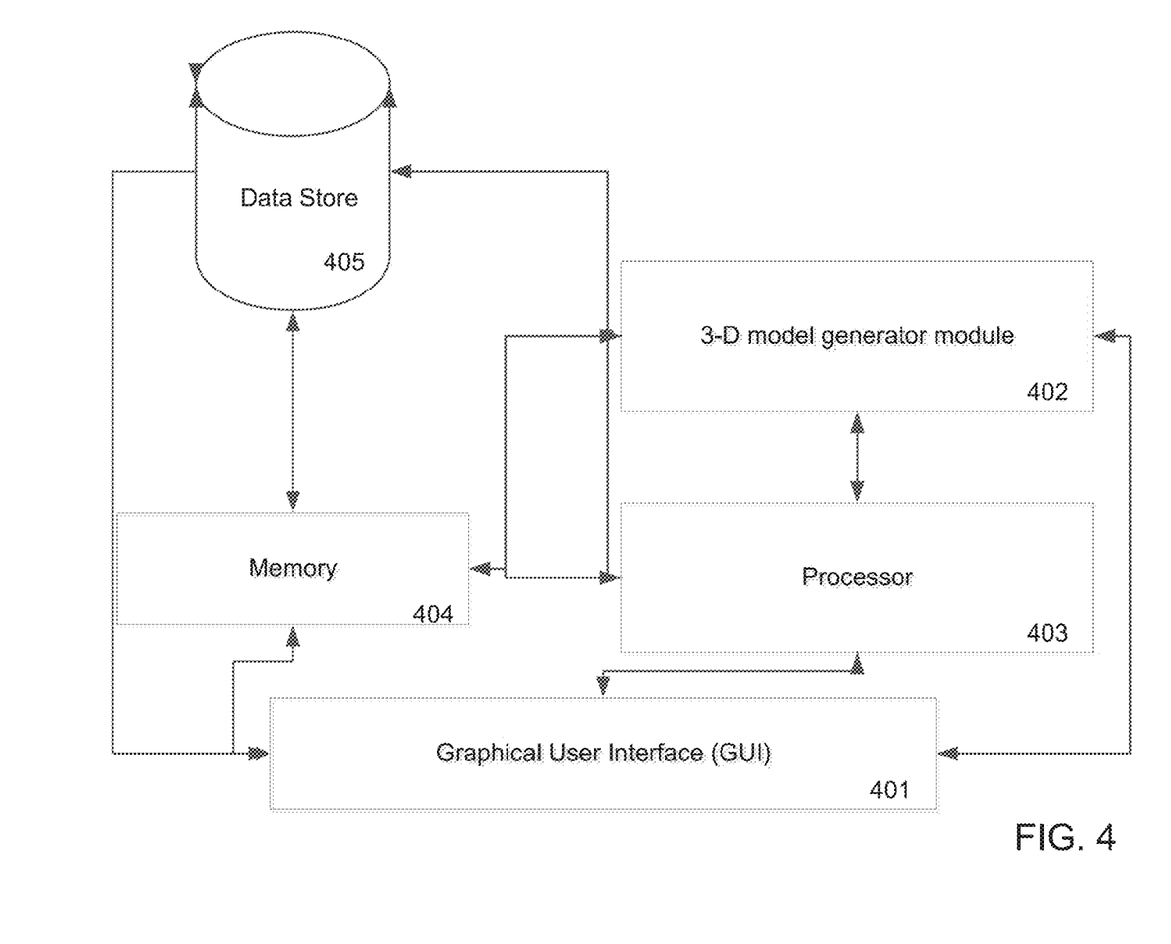
FIG. 4 is a schematic of an exemplary embodiment of a local system for generating three dimensional models from two dimensional views.

Turning now to FIG. 4, another exemplary embodiment of a system for generating three dimensional models from two dimensional views is shown. In this embodiment, the system is provided for on a single computing device, with a graphical user interface (GUI) 401 replacing the communications means 301 of FIG. 3 for communications with a user. Similar to the previously described embodiment, the system is comprised of a 3-D model generator module 402, a processor 403, a non-transitory memory module 404 and a data store 405. In this embodiment, the 3-D model generator module 302 works in conjunction with the processor 303, memory 304, data store 305 and GUI 301 to process 3-D models for a computing device operated by the user. This is a local system model, whereby the system is generally provided on a single computing device or clustered computing device configured to receive inputs from the user. While the embodiment shown in FIG. 4 is an exemplary embodiment, other embodiments may include additional or fewer components. One of ordinary skill in the art would appreciate that there are numerous configurations of the components that could be utilized with embodiments of the present invention, and embodiments of the present invention are contemplated for use with any configuration of components.

According to an embodiment of the present invention, the 3-D model generator module may be comprised of computer-executable code stored in non-transitory memory and configured to instruct a processing means (e.g., CPU) to process the computer-executable code in order to perform the desired functionality described herein. The 3-D model generator module is configured to receive one or more 2-D files or other 2-D data from one or more sources. The sources providing the 2-D data to the 3-D generator module may include, but are not limited to, submission from a user, provided from a data store (e.g., database, storage medium, cloud storage, image provider) or any combination thereof. One of ordinary skill in the art would appreciate that there are numerous manners in which the 3-D generator module may receive 2-D data for use.

According to an embodiment of the present invention, the 3-D model generator module is configured to utilize the 2-D data to render a 3-D model. The 3-D rendering may be assisted by information received from a data store. Information that could be used to assist the 3-D model generator module in rendering the 3-D model include, but are not limited to, input from patternmakers, production components, production materials, defined cut and sew lines, manufacturing tolerances, manufacturing allowances or any combination thereof. One of ordinary skill in the art would appreciate that there are numerous types of information and inputs that could be utilized by embodiments of the system, and embodiments of the present invention are contemplated for use with any type of information and/or inputs.

According to an embodiment of the present invention, once the 3-D model has been generated, the 3-D model is provided to the user via a graphical user interface (GUI). As noted above, this may either be directly provided by the system or provided over a network to the computing device of the user which is communicatively connected to the system. The look and feel of the GUI may be based at least in part on the information used to assist the 3-D model generator in generating the model. For instance, cut and sew lines may be identified, capable of being shown/hidden depending on user input or otherwise displayed on the GUI.

According to an embodiment of the present invention, the GUI may be provided by way of a 2-D GUI that allows for the user to make corrections or modifications on a 2-D GUI that are converted and represented on the 3-D model, in real time or near real time. For instance, the user may be provided the ability to make changes in a 2-D illustration software and have those changes recorded, processed and displayed in real time or near real time onto the 3-D model.

According to an embodiment of the present invention, from the GUI, the user may manipulate the 3-D model in order to confirm, improve, modify or otherwise change or add materials to the 3-D model. For instance, the user may be able to customize the 3-D model by placing artwork, color schemes, text (e.g., names, initials, numbers, team name) or other modifications on the 3-D model. This information may be provided to the system by the user in various manners, including, but not limited to, uploading data from the computing device of the user, receiving input from the user via an interface device (e.g., mouse, keyboard, touch screen), receiving input from a capture device (e.g., camera, web camera, audio device) or any combination thereof.

According to an embodiment of the present invention, the system may be configured to calculate changes that may occur upon modification of 2-D data (e.g., in an illustrator software program) or the 3-D model. For instance, the system may be configured to calculate a seam allowance associated with a modification, where the seam allowance is affected by the movement of a piece of artwork or pattern across one or more seems of resulting patterns/clothing that will be produced as the end result of the process.

According to an embodiment of the present invention, once the user has confirmed and appropriately modified the 3-D model in the GUI, the user can submit the final product to the system for processing. The 3-D model generator module will receive the final product and process the final product based on specifications identified by the user. This may include generating flat cut files for use in creating an apparel design pattern or finalized product from the 3-D model. This may require the 3-D model generator module to convert the 3-D model back into a 2-D file or other format for production.

In a preferred embodiment of the present invention, the conversion between 2-D and 3-D is done in real time. The user may make adjustments on a 2-D data (e.g., the flat cut files) and the modifications are automatically processed by the 3-D model generator module into the 3-D model for display to the user. In this manner, the user is able to have the 2-D data in front of them while instantaneously reviewing the modifications as would be present in the 3-D model.

Exemplary Embodiments

Figure 5:
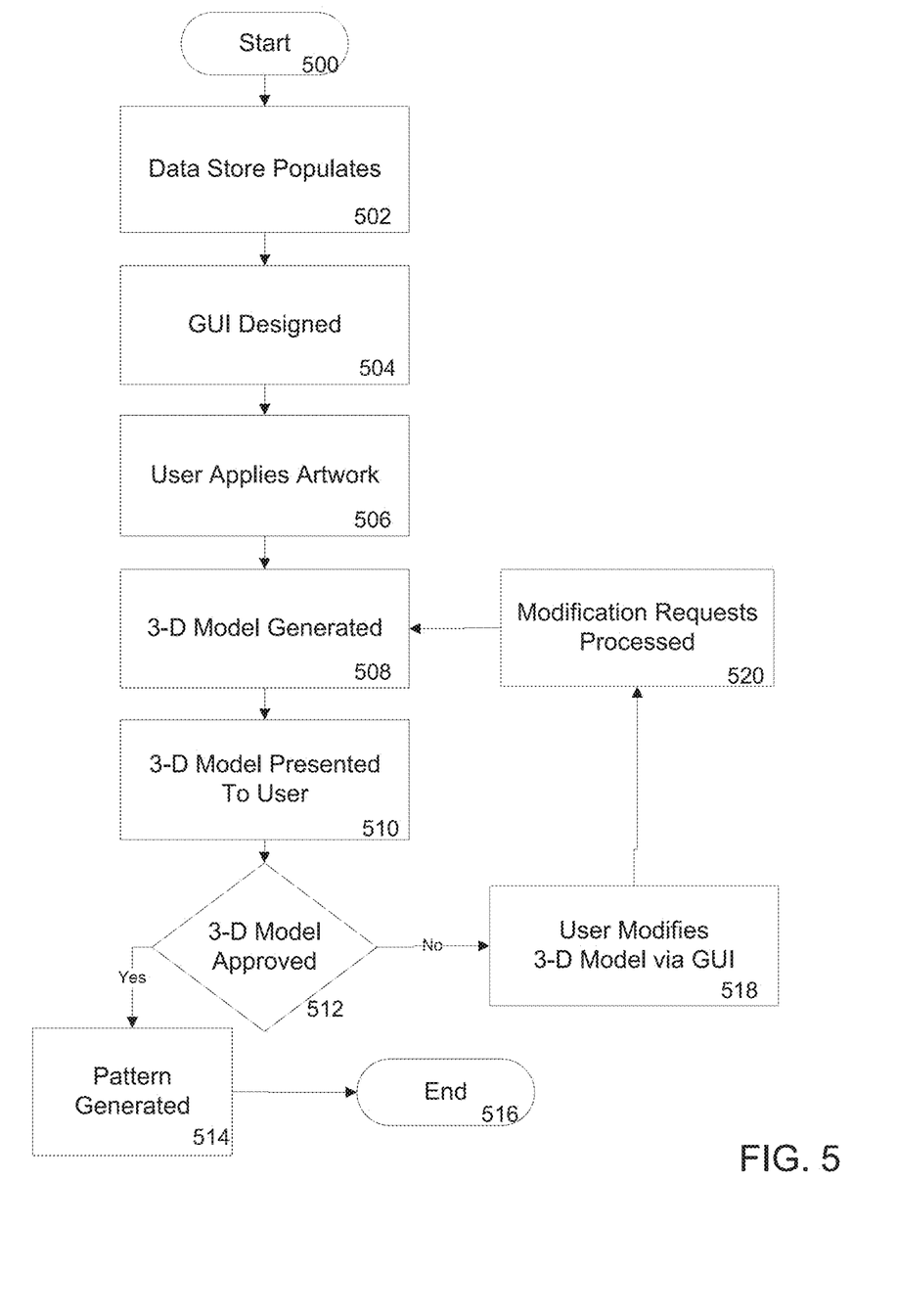
FIG. 5 is a flowchart of an exemplary method in accordance with an embodiment of the present invention.

The following is an exemplary embodiment of a method for utilization of the graphics correction engine, as shown in FIG. 5. At step 500, the process starts with a user initiating a request for processing 2-D data into a 3-D model.

At step 502, the system populates a data store in response to the user initiated request. As noted above, the data store will populate with data associated with the particular request. This may include data related to the patterns for the apparel to be generated, cut and sew lines, seam allowances and other relevant model data.

At step 504, the system generates the GUI for the request. In generation of the GUI, the system utilizes the information populated into the data store.

At step 506, the user applies artwork or other data to the GUI for use in the 3-D model. In certain embodiments, the user may be provided the ability to add data or artwork at later points in the process as well if so desired.

At step 508, the system generates the 3-D model based on the input from the user, the request and the information populated into the data store. Conversion of the 2-D data is done through the use of the 3-D model generator module.

At step 510, the 3-D model is presented to the user for review. In general, the 3-D model may be presented on a display designed to present 2-D images (e.g., monitors, TVs). The system may also be configured to utilize and present the 3-D model on a display designed to present 3-D images (e.g., 3D TVs).

At step 512 the user determines the acceptability of the 3-D model for the user's purpose and desires. If the 3-D model is approved, the system proceeds to step 514 and the 3-D model is utilized as intended by the original request (e.g., generate a pattern for use with production of customized apparel). The process then terminates at step 516. If the 3-D model is not approved, the process continues to step 518.

At step 518, the user is provided the ability to modify or otherwise alter the 3-D model either through direct interaction with the 3-D model or by requesting the system take some action through options presented to the user (e.g., auto-alignment of artwork, auto-alignment of elements, match color scheme).

At step 520, the modifications are processed by the 3-D model generator module and the process returns to step 508 for further rendering and approval by the user. This loop can continue as many times as necessary in order to get the 3-D model into a format the user approves of.

Figure 6:
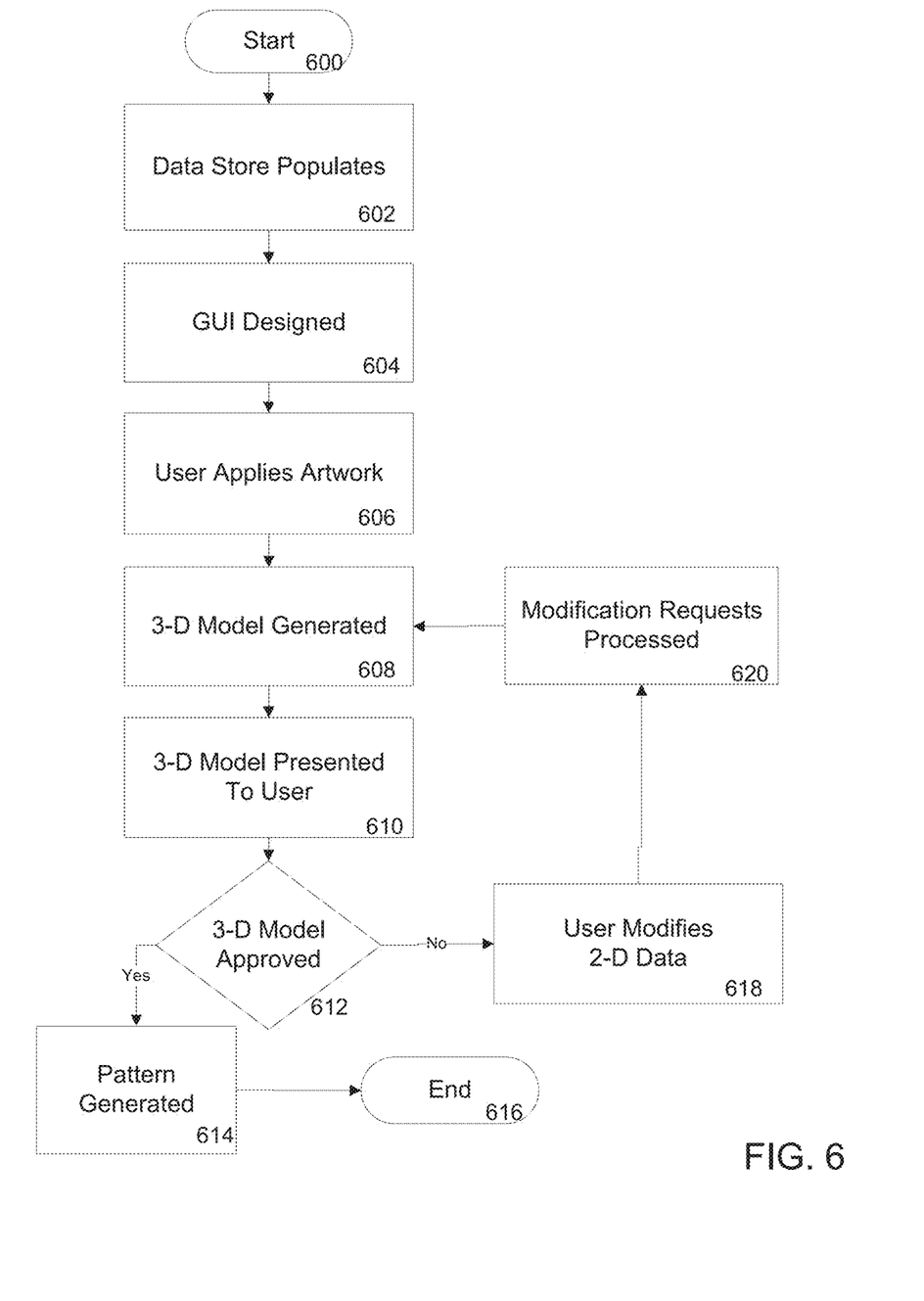
FIG. 6 is a flowchart of an exemplary method in accordance with an embodiment of the present invention.

The following is an exemplary embodiment of a method for utilization of the graphics correction engine, as shown in FIG. 6 (and as assisted in reference through FIGS. 6A-6F). At step 600, the process starts with a user initiating a request for processing 2-D data into a 3-D model.

At step 602, the system populates a data store in response to the user initiated request. As noted above, the data store will populate with data associated with the particular request. This may include data related to the patterns for the apparel to be generated, cut and sew lines, seam allowances and other relevant model data.

Figure 6A:
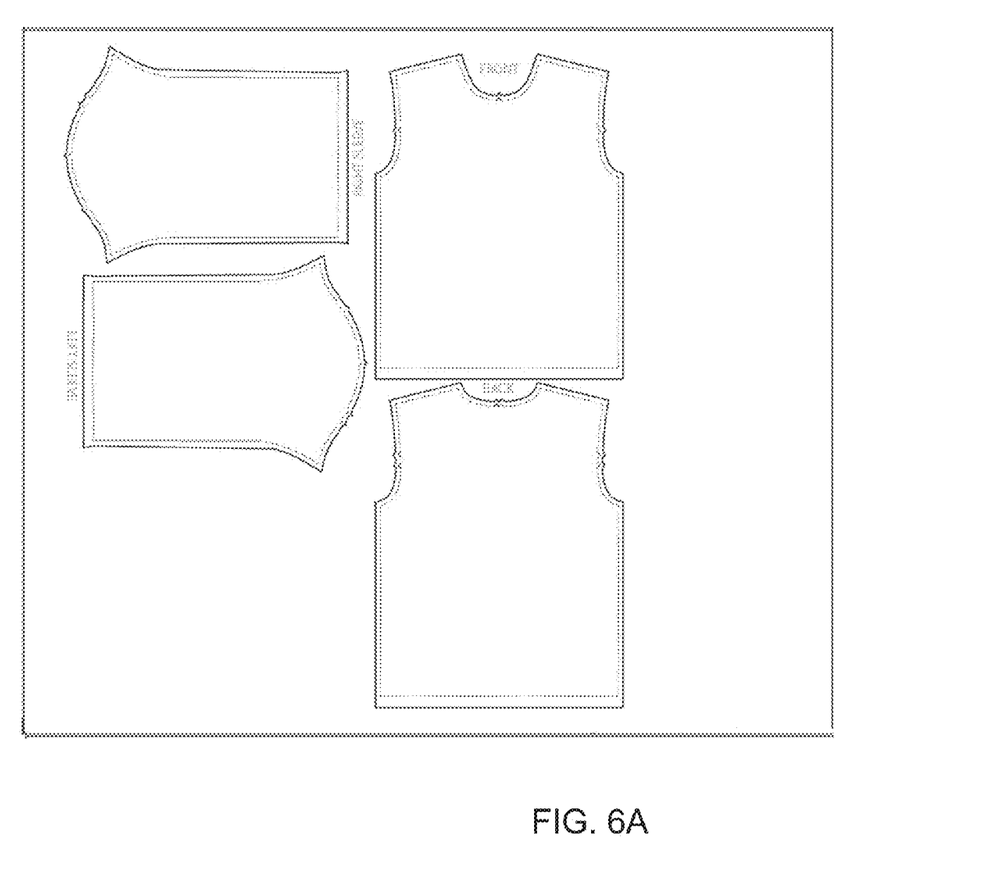
FIG. 6A is an exemplary embodiment of a 2-D GUI in accordance with an embodiment of the present invention.
Figure 6B:
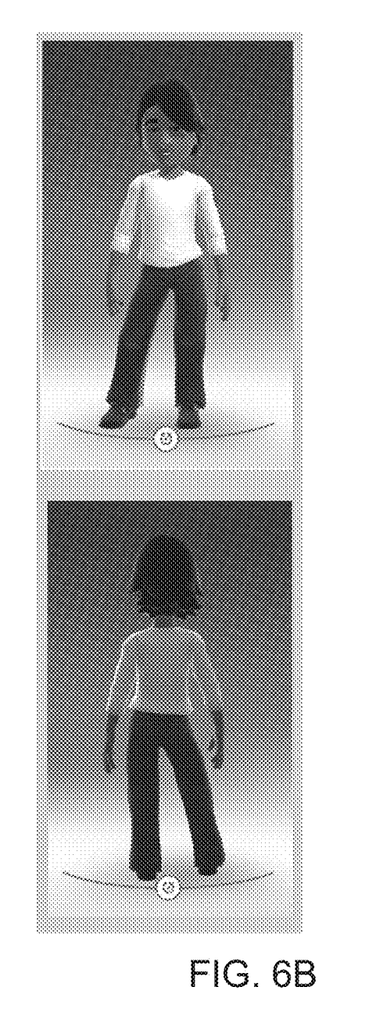
FIG. 6B is an exemplary embodiment of a 3-D Model in accordance with an embodiment of the present invention.

At step 604, the system generates a 2-D GUI for the request (e.g., FIG. 6A showing 2-D data on an editable format). In generation of the 2-D GUI, the system utilizes the information populated into the data store.

Figure 6C:
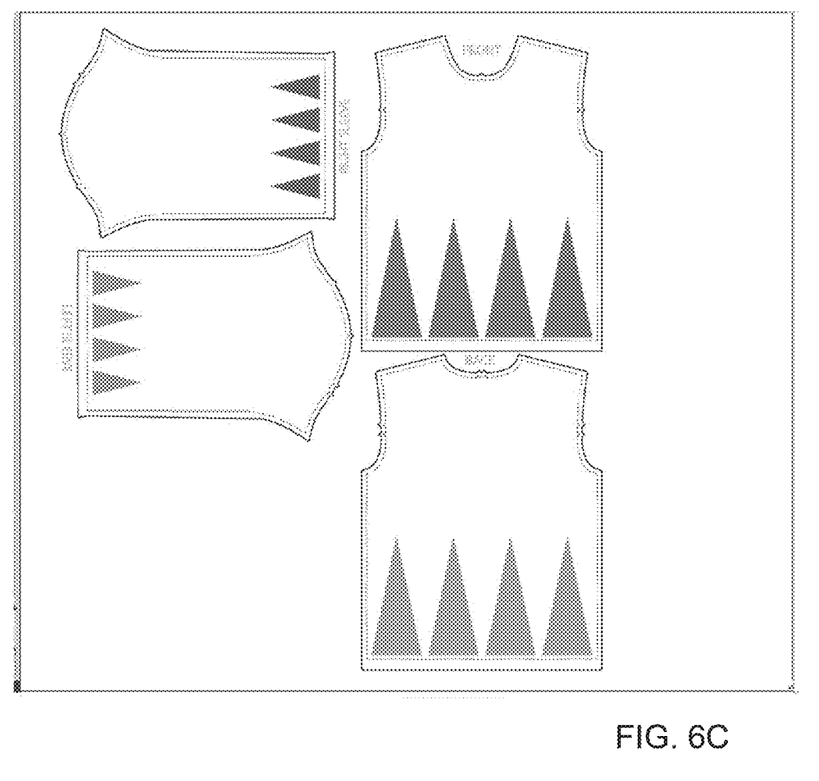
FIG. 6C is an exemplary embodiment of a 2-D GUI in accordance with an embodiment of the present invention.
Figure 6D:
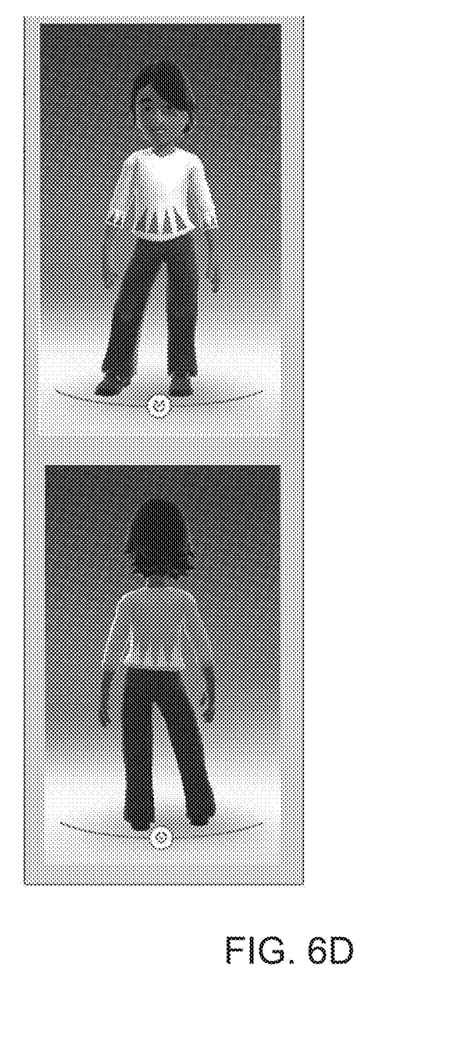
FIG. 6D is an exemplary embodiment of a 3-D Model in accordance with an embodiment of the present invention.

At step 606, the user applies artwork or other data to the 2-D GUI (e.g., FIG. 6C showing 2-D data on an editable format with additional artwork) for use in the 3-D model (e.g., FIG. 6D showing 3-D model with the rendered artwork in 3-D). In certain embodiments, the user may be provided the ability to add data or artwork at later points in the process as well if so desired.

At step 608, the system generates the 3-D model based on the input from the user, the request and the information populated into the data store. Conversion of the 2-D data is done through the use of the 3-D model generator module and is done in real time (i.e., actions taken on the 2-D GUI/data appear in real time on the 3-D model).

At step 610, the 3-D model is presented to the user for review (e.g., FIG. 6D showing 3-D model with the rendered artwork in 3-D). In general, the 3-D model may be presented on a display designed to present 2-D images (e.g., monitors, TVs). The system may also be configured to utilize and present the 3-D model on a display designed to present 3-D images (e.g., 3D TVs).

At step 612 the user determines the acceptability of the 3-D model for the user's purpose and desires. If the 3-D model is approved, the system proceeds to step 614 and the 3-D model is utilized as intended by the original request (e.g., generate a pattern for use with production of customized apparel). The process then terminates at step 616. If the 3-D model is not approved, the process continues to step 618.

Figure 6E:
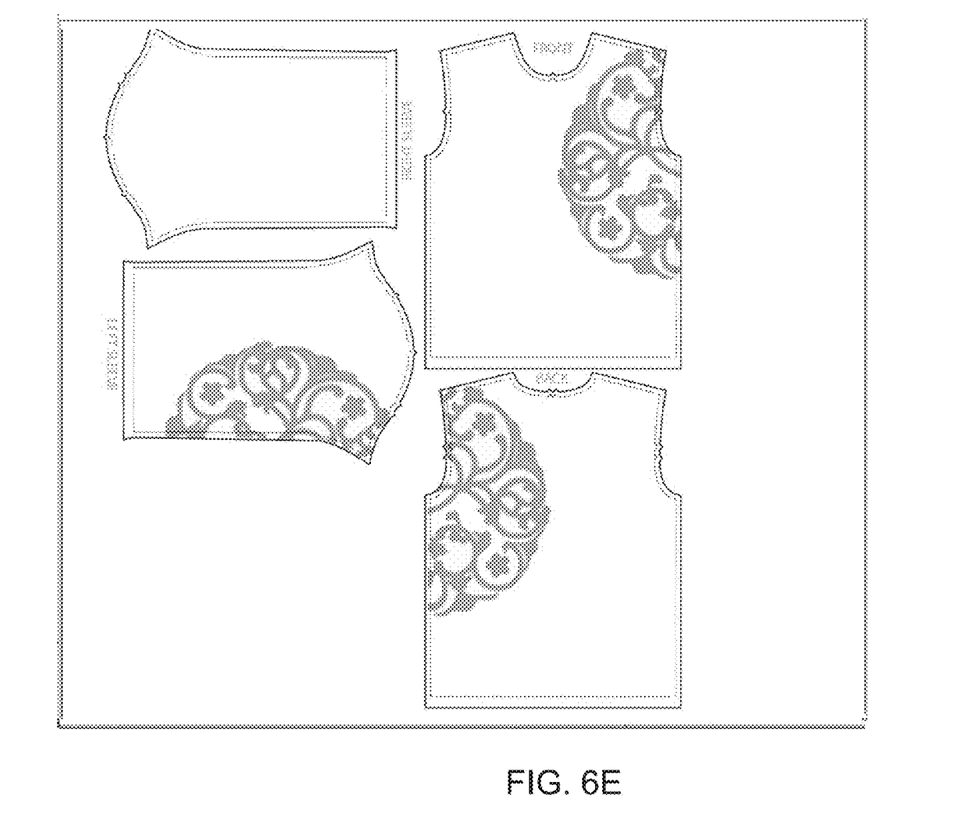
FIG. 6E is an exemplary embodiment of a 2-D GUI in accordance with an embodiment of the present invention.

At step 618, the user is provided the ability to modify or otherwise alter the 3-D model through direct interaction with the 2-D GUI or data (e.g., in a 2-D illustration software program) (e.g., FIG. 6E showing 2-D GUI with updated artwork).

Figure 6F:
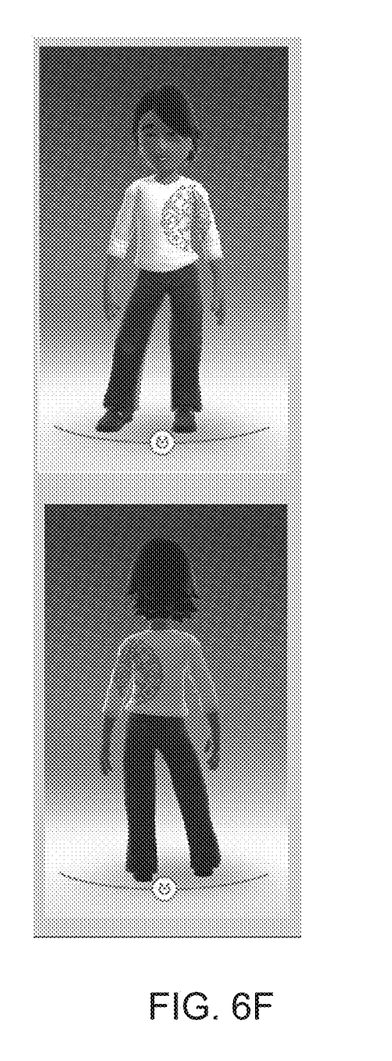
FIG. 6F is an exemplary embodiment of a 3-D Model in accordance with an embodiment of the present invention.

At step 620, the modifications are processed by the 3-D model generator module (e.g., FIG. 6F showing 3-D model with the updated rendered artwork in 3-D) and the process returns to step 608 for further rendering and approval by the user. This loop can continue as many times as necessary in order to get the 3-D model into a format the user approves of.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A programmed computer system comprising:
   a 3-D model generator module comprising physical memory storing instructions that is configured to:
   (i) receive one or more data files comprising of a 2-D apparel template, fabric pattern data, cut and sew line data, and seam allowance data;
   (ii) provide a user interface to a user, wherein said user interface presents said 2-D apparel template in an editable format;
   (iii) receive artwork from said user;
   (iv) apply said artwork to modify said 2-D apparel template;
   (v) render a 3-D model to said user based on the modified 2-D apparel template, wherein said 3-D model incorporates said artwork;
   (vi) calculate a new seam allowance in said 3-D model whenever said user moves a piece of said artwork or a clothing pattern across one or more seems in said 2-D apparel template;
   (vii) provide multiple views of said 3-D model, wherein said 3-D model may be rotated 360 degrees; and
   (viii) generate a new garment pattern and apparel design using the 3-D model which incorporates the newly calculated seam allowance.

2. The programmed computer system of claim 1, wherein said garment pattern is printed onto a physical medium via a printing means.

3. The programmed computer system of claim 1, wherein said garment pattern comprises two dimensional flat cut pieces.

4. The programmed computer system of claim 1, wherein said 3-D model generator module is provided over one or more networks in a web-based manner.

5. The programmed computer system of claim 1, wherein said instructions further cause said 3-D model generator module to receive modifications to said three dimensional model from said user.

6. The programmed computer system of claim 1, wherein said instructions further cause said 3-D model generator module to populate a data store with inputs from patternmakers and production models.

7. The programmed computer system of claim 6, wherein said user interface is based at least in part on said inputs of said data store.

8. A computerized method for generating 3-D models for apparel design, the method comprising the steps of:
   (i) receiving one or more data files compromising a 2-D apparel template, fabric pattern data, cut and sew line data, and seam allowance data;
   (ii) providing a user interface to a user, wherein said user interface presents said 2-D apparel template in an editable format;
   (iii) receiving artwork from said user;
   (iv) applying said artwork to modify said 2-D apparel template;
   (v) rendering a 3-D model to said user based on the modified 2-D apparel template, wherein said 3-D model incorporates said artwork;
   (vi) calculating a new seam allowance in said 3-D model whenever said user moves a piece of said artwork or a clothing pattern across one or more seems in said 2-D apparel template;
   (vii) providing multiple views of said 3-D model wherein said 3-D model may be rotated 360 degrees; and
   (viii) generating a new garment pattern and apparel design using the 3-D model which incorporates the newly calculated seam allowance.

9. The method of claim 8, further comprising the step of printing said garment pattern onto a physical medium via a printing means.

10. The method of claim 8, wherein said garment pattern comprises two dimensional flat cut pieces.

11. The method of claim 8, wherein said 3-D model generator module is provided over one or more networks in a web-based manner.

12. The method of claim 8, further comprising the step of receiving modifications to said three dimensional model from said user.

13. The method of claim 8, further comprising the step of populating a data store with inputs from patternmakers and production models.

14. The method of claim 13, wherein said user interface is based at least in part on said inputs of said data store.

15. The programmed computer system of claim 1, wherein edits, modification, and corrections on said user interface are represented on said 3-D model in real time.

16. The programmed computer system of claim 1, wherein said system allows for customization of said 3-D model.

* * * * *